April 2, 1968 R. R. FARRELL 3,375,901
LUBRICATED ROTATABLE DEVICE
Filed June 3, 1965

INVENTOR
Richard R. Farrell

United States Patent Office 3,375,901
Patented Apr. 2, 1968

3,375,901
LUBRICATED ROTATABLE DEVICE
Richard R. Farrell, Oakmont, Pa., assignor to Universal Lubrication Systems, Inc., Oakmont, Pa., a corporation of Pennsylvania
Filed June 3, 1965, Ser. No. 461,011
2 Claims. (Cl. 184—1)

ABSTRACT OF THE DISCLOSURE

A lubricated rotatable device such as a coupling having parts which partake of relative frictional movement when the device rotates such as inner and outer coupling members for each of two adjacent shaft ends, the device comprising opposed dynamically balanced fittings, one of the fittings having means for connection thereto of a lubricant gun, duct means for conducting to the parts of the device lubricant forced in by the lubricant gun and means for holding the lubricant in such parts when the lubricant gun is disconnected from the fitting, the other of the fittings having duct means in communication with the parts of the device and open to the outside and means normally closing such duct means to contain lubricant in the device but yieldable under the pressure of the lubricant when the gun is forcing in lubricant to allow lubricant to pass.

---

Figure 1:
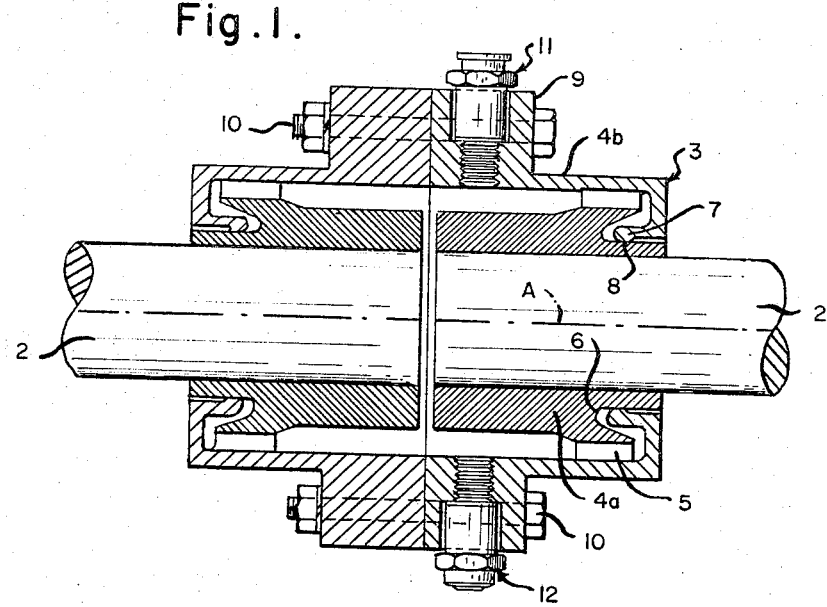

This invention relates to a lubricated rotatable device and particularly such a device which has parts which partake of relative frictional movement when the device rotates and which requires means for lubricating such parts. More particularly the invention relates to a lubricated coupling. For purposes of explanation and illustration the invention will be described as embodied in a lubricated coupling, a self-aligning coupling having been selected for illustration in the drawings.

A lubricated coupling of the type above mentioned comprises inner and outer coupling members for each of two adjacent shaft ends. Each shaft end is connected to its inner coupling member so as to be non-rotatable with respect thereto. Driving elements are provided on the inner and outer coupling members connecting each inner coupling member to its outer coupling member whereby one is driven from the other. The outer coupling members are connected together so that they rotate as a unit. The driving elements of the inner and outer coupling members, which may be in a form somewhat resembling gear teeth, partake of relative frictional movement when the coupling rotates and it is necessary to deliver lubricant to such driving elements to inhibit wear and overheating due to relative frictional movement thereof.

Self-aligning couplings are well known in the art. Heretofore provision has been made for lubricating such couplings by providing opposed bores each normally closed by a plug commonly termed a "lube plug," the lube plugs being dynamically balanced since the coupling is adapted to rotate at high speed. When the coupling was to be lubricated the opposed lube plugs were removed and lubricant was delivered into one of the bores, any air in the coupling being expelled through the opposite bore, and emergence of lubricant from the opposite bore indicating completion of lubrication of the coupling. Originally oil was used for lubricating such couplings and was simply poured in. More recently heavier lubricant such as grease has been found preferable because of leaking out of the oil and the relatively heavy duty which the couplings perform. Prior to the present invention lubrication of such a coupling with grease was accomplished by removing the opposed lube plugs and inserting a grease gun adapter into one of the bores and applying a grease gun to the adapter to force in the grease. Emergence of grease from the opposite bore indicated completion of lubrication of the coupling. Then the adapter was removed and the lube plugs reapplied.

The work necessary to lubricate such couplings, including the removal of two lube plugs, the application of an adapter, the removal of the adapter and the replacement of the two lube plugs, was so onerous that lubrication of couplings was neglected with the result that couplings burned out and had to be frequently replaced. Self-aligning couplings are used in large quantities in industrial plants employing aligned driving and driven shafts. For example, in rolling mills very large numbers of such couplings are employed. Prior to the present invention it was virtually impossible within a reasonable labor cost budget to maintain the self-aligning couplings in rolling mills adequately lubricated. Even the leading steel companies knowingly did not adequately lubricate the self-aligning couplings of their rolling mills resulting in heavy expense in time and material for replacement of burned out couplings.

I have devised a lubricated rotatable device which solves the problems heretofore encountered as above referred to. I obviate removal and replacement of lube plugs and application and removal of lubricant adapters. My device comprises opposed dynamically balanced fittings applied thereto. One of the fittings has means for connection thereto of a lubricant gun and duct means for conducting lubricant forced in by the lubricant gun to parts of the device which partake of relative frictional movement when the device rotates. Means are provided for holding in lubricant forced in by the lubricant gun when the lubricant gun is disconnected from the fitting. The other of the opposed dynamically balanced fittings has duct means in communication with the relatively frictionally movable parts and open to the outside of the device together with means normally closing such duct means to contain lubricant in the device but yieldable under the pressure of the lubricant when the lubricant gun is forcing in lubricant to allow lubricant to pass.

More specifically I provide a lubricated coupling comprising inner and outer coupling members for each of two adjacent shaft ends, each shaft end being connected to its inner coupling member so as to be non-rotatable with respect thereto, driving elements on the inner and outer coupling members connecting each inner coupling member to its outer coupling member whereby one is driven from the other, means connecting the outer coupling members together so that they rotate as a unit, the driving elements on the inner and outer coupling members partaking of relative frictional movement when the coupling rotates, at least one of the outer coupling members comprising opposed dynamically balanced fittings, one of such fittings having means for connection thereto of a lubricant gun, duct means for conducting to the driving elements lubricant forced in by the lubricant gun and means for holding in lubricant forced in by the lubricant gun when the lubricant gun is disconnetced from the fitting, the other of such fittings having duct means in communication with the driving elements and open to the outside of the coupling and means normally closing the last mentioned duct means to contain lubricant in the coupling but yieldable under the pressure of the lubricant when the lubricant gun is forcing in lubricant to allow lubricant to pass.

Other details, objects and advantages of the invention will become apparent as the following description of a present preferred embodiment thereof proceeds.

Figure 3:
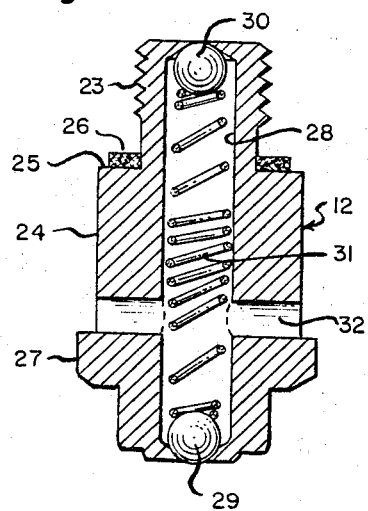
Figure 2:
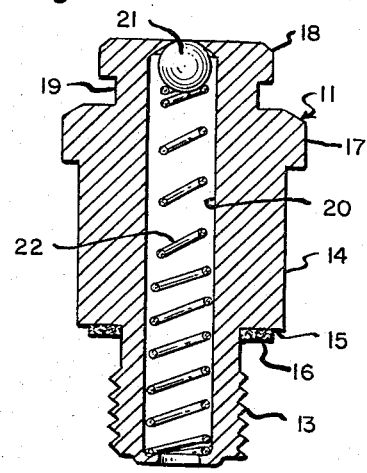

In the accompanying drawings I have shown a present preferred embodiment of the invention in which FIGURE 1 is an axial cross-sectional view of a lubricated rotatable device in the form of a self-aligning coupling embodying my invention;

FIGURE 2 is an axial cross-sectonal view of the fitting through which lubricant is applied to the device; and FIGURE 3 is an axial cross-sectional view of the relief fitting which in the coupling is disposed diametrically opposite the fitting through which lubricant is applied.

Referring now more particularly to the drawings, FIGURE 1 shows two shaft ends 2 which are connected by a self-aligning coupling designated generally by reference numeral 3. The self-aligning coupling comprises inner and outer coupling members for each of the adjacent shaft ends. Since the coupling, except for the lubricating means presently to be described, is symmetrical about a transverse plane intermediate the shaft ends description of the portion of the coupling applied to one of the shaft ends applies also to the other portion thereof. Applied to each shaft end is an inner coupling member 4a which is connected to its shaft end so as to be nonrotatable with respect thereto, as, for example, by being keyed or splined thereto. Each of the inner coupling members 4a is to all intents and purposes unitary with the shaft end to which it is applied. Each inner coupling member 4a has outwardly facing driving elements 5 which have generally the shape of gear teeth and which "mesh" with similar inwardly facing driving elements in the corresponding outer coupling member as will presently be described. Each inner coupling member 4a has a re-entrant portion 6 for a purpose presently to be described.

Disposed about each inner coupling member 4a is an outer coupling member 4b having the inwardly facing driving elements above referred to which are interposed between the driving elements 5 of the inner coupling member so that when either the inner coupling member or the outer coupling member is driven by a source of power it will drive the other thereof. Each outer coupling member 4b has an inwardly and reversely turned end flange 7 entering the re-entrant portion 6 of the corresponding inner coupling member 4a and bearing against the inner coupling member at 8 to minimize leakage of lubricant from the coupling. Each outer coupling member 4b has a radially outwardly projecting enlargement 9 as shown in FIGURE 1 and the outer coupling members 4b are connected together by bolts 10 so that they rotate as a unit.

The self-aligning coupling as thus far described may be conventional. During rotation the driving elements 5 of the inner coupling members and the interposed driving elements of the outer coupling members insure rotation together of the inner and outer coupling members but there will be some deviation of the shaft axes from the common axis A shown in FIGURE 1 resulting in relative frictional movement between the driving elements of each inner coupling member and the cooperating driving element of the corresponding outer coupling member. The friction is great enough that if the driving elements are not kept lubricated the coupling will heat up and burn out.

I have described above the prior provision for lubricating self-aligning couplings which proved inadequate and unsatisfactory. I provide in at least one of the outer coupling members 4b opposed dynamically balanced fittings designated generally by reference numerals 11 and 12 respectively. The fitting 11 is shown to enlarged scale in FIGURE 2 and the fitting 12 is shown to enlarged scale in FIGURE 3. The fittings 11 and 12 are dynamically balanced, i.e., they are diametrically opposed, they are of equal mass and their centers of gravity are equidistant from the axis of the coupling. The fitting 11 consists of a reduced externally threaded inner end 13 and a relatively enlarged body portion 14 forming between them a shoulder 15 against which is disposed a gasket 16. The body portion 14 has a radially projecting hexagonal flange 17 for reception of a wrench and a "button head" 18 forming with the flange 17 an annular recess or groove 19 for reception of the chuck of a lubricant gun. The fitting 11 has therethrough an axial bore 20. The outer end of the bore is normally closed by a ball valve 21 resiliently maintained in closed position by a compression coil spring 22. The fitting 11 per se may be a standard or conventional lubricating fitting.

The fitting 12 is, as above stated, dynamically balanced with respect to the fitting 11. The fitting 12 consists of a reduced externally threaded inner end 23 and a relatively enlarged body portion 24 forming between them a shoulder 25 against which is disposed a gasket 26. The body portion 24 has a radially projecting hexagonal flange 27 for reception of a wrench. The fitting 12 has therethrough an axial bore 28. The outer end of the bore is closed by a ball valve 29 and the inner end of the bore is normally closed by a ball valve 30. A compression coil spring 31 is biased between the ball valves 29 and 30. A cross bore 32 extends through the fitting just below the flange 27 and intersects the longitudinal bore 28.

The fittings 11 and 12 are applied to the coupling as shown in FIGURE 1, the reduced externally threaded portions 13 and 23 of the respective fittings being threaded into the coupling to tightly compress the gaskets 16 and 26 to prevent leakage of lubricant therepast. The parts are so proportioned that, as shown in FIGURE 1, when the fittings are applied the flanges 17 and 27 thereof are spaced somewhat from the outer surface of the outer coupling member.

When the coupling is to be lubricated the lubricating gun is applied to the fitting 11 and lubricant is forced therethrough in conventional manner. The lubricant forced in through the fitting 11 unseats the ball valve 21, slightly compressing the spring 22, and the lubricant fills the space inside the coupling and lubricates the driving elements. Lubricant is introduced into the fitting 11 under pressure until the space within the coupling is filled with lubricant and the pressure of the lubricant in the coupling unseats the ball valve 30 of the fitting 12, slightly compressing the spring 31. The lubricant fills the bore 28 and some thereof passes out through the transverse bore 32. When such lubricant appears that is a signal that the coupling has been completely lubricated whereupon the lubricant gun is removed and the ball valves 21 and 30 resume their seats under the action of the springs 22 and 31. Thus the ball valve 30 normally closes the bore 28 at its inner end to contain lubricant in the coupling but is yieldable under the pressure of the lubricant when the lubricant gun is forcing in lubricant to allow lubricant to pass. The ball valve 29 is held closed at all times. It is not necessary to have a ball valve at the outer end of the fitting 12, which outer end may be permanently closed. However for manufacturing reasons it is preferred to form the bore 28 completely through the fitting 12 and to close the outer end with the ball valve 29. Those skilled in the art will of course understand that when the springs and ball valves have been inserted into their respective fittings the annular portions of the fittings at the extremities of the longitudinal bores are deformed inwardly to hold the ball valves and springs in place as shown.

My invention makes practicable the lubricating of large numbers of self-aligning couplings as the workman simply applies the lubricating gun to each fitting 11 and forces in lubricant until he sees lubricant emerging through the transverse bore 32 of the fitting 12. No lube plugs need to be removed or replaced and no adapter has to be applied and removed. The operation requires a very small fraction of the time required to lubricate a self-aligning coupling prior to my invention. Employment of my invention results in maintaining of the couplings in proper lubricated condition and minimizes the necessity for replacing burned out couplings. A very great saving is effected in labor cost and cost of replacement couplings.

While I have shown and described a present preferred embodiment of the invention it is to be distinctly understood that the invention is not limited thereto but may be otherwise variously embodied within the scope of the following claims.

I claim:

1. A lubricated rotatable device having parts which partake of relative frictional movement when the device rotates, the device comprising opposed dynamically balanced fittings, one of such fittings having means for connection thereto of a lubricant gun, duct means for conducting to said parts lubricant forced in by the lubricant gun and means for holding in lubricant forced in by the lubricant gun when the lubricant gun is disconnected from the fitting, the other of such fittings having duct means in communication with said parts and open to the outside of the device and means normally closing the last mentioned duct means to contain lubricant in the device but yieldable under the pressure of the lubricant when the lubricant gun is forcing in lubricant to allow lubricant to pass.

2. A lubricated coupling comprising inner and outer coupling members for each of two adjacent shaft ends, each shaft end being connected to its inner coupling member so as to be non-rotatable with respect thereto, driving elements on the inner and outer coupling members connecting each inner coupling member to its outer coupling member whereby one is driven from the other, means connecting the outer coupling members together so that they rotate as a unit, the driving elements on the inner and outer coupling members partaking of relative frictional movement when the coupling rotates, at least one of the outer coupling members comprising opposed dynamically balanced fittings, one of such fittings having means for connection thereto of a lubricant gun, duct means for conducting to the driving elements lubricant forced in by the lubricant gun and means for holding in lubricant forced in by the lubricant gun when the lubricant gun is disconnected from the fitting, the other of such fittings having duct means in communication with the driving elements and open to the outside of the coupling and means normally closing the last mentioned duct means to contain lubricant in the coupling but yieldable under the pressure of the lubricant when the lubricant gun is forcing in lubricant to allow lubricant to pass.

References Cited
UNITED STATES PATENTS

| | | |
|---|---|---|
| 2,025,502 | 12/1935 | Fageol. |
| 2,974,501 | 3/1961 | Kaufman et al. _____ 64—9 |
| 3,070,219 | 12/1962 | Donadio _____ 184—6 X |
| 3,097,424 | 7/1963 | Martiny _____ 64—32 X |

LAVERNE D. GEIGER, *Primary Examiner.*

E. J. EARLS, *Assistant Examiner.*

UNITED STATES PATENT OFFICE
CERTIFICATE OF CORRECTION

Patent No. 3,375,901            April 2, 1968

Richard R. Farrell

It is certified that error appears in the above identified patent and that said Letters Patent are hereby corrected as shown below:

In the heading to the printed specification, line 4, "Lubrication" should read -- Lubricating --.

Signed and sealed this 29th day of July 1969.

(SEAL)
Attest:

Edward M. Fletcher, Jr.
Attesting Officer

WILLIAM E. SCHUYLER, JR.
Commissioner of Patents